US00RE48605E

(19) United States
(12) Reissued Patent
Choi et al.

(10) Patent Number: US RE48,605 E
(45) Date of Reissued Patent: Jun. 22, 2021

(54) METHOD AND APPARATUS FOR MANAGING POWER OF WLAN MODULE IN PORTABLE TERMINAL

(71) Applicant: Samsung Electronics Co., Ltd., Suwon-si (KR)

(72) Inventors: Jong-Mu Choi, Gunpo-si (KR); Jun-Yeop Jung, Suwon-si (KR); Jeong-Hoon Han, Seoul (KR)

(73) Assignee: Samsung Electronics Co., Ltd., Suwon-si (KR)

(21) Appl. No.: 14/626,574

(22) Filed: Feb. 19, 2015

Related U.S. Patent Documents

Reissue of:
(64) Patent No.: 8,379,556
Issued: Feb. 19, 2013
Appl. No.: 12/797,048
Filed: Jun. 9, 2010

(30) Foreign Application Priority Data

Jun. 12, 2009 (KR) ..... 10-2009-0052540

(51) Int. Cl.
*G08C 17/02* (2006.01)
*H04W 52/02* (2009.01)

(52) U.S. Cl.
CPC ..... *H04W 52/0251* (2013.01); *Y02D 30/70* (2020.08)

(58) Field of Classification Search
CPC ..... H04W 52/0216; H04W 52/0209; H04W 52/0258; H04W 52/00; H04W 52/02;
(Continued)

(56) References Cited

U.S. PATENT DOCUMENTS 6,975,614 B2 * 12/2005 Kennedy ..... H04W 8/005 370/338
7,274,929 B1 * 9/2007 Banginwar ..... H04W 52/0258 455/418

(Continued)

FOREIGN PATENT DOCUMENTS

JP 2007-329696 A 12/2007
KR 10-0728848 B2 6/2007

(Continued)

OTHER PUBLICATIONS

Yong He et al: "MAC 01-5—The IEEE 802.11 Power Saving Mechanism: An Experimental Study". Wireless Communications and Networking Conference. 2008. WCNC 2008. IEEE. IEEE. Piscataway. NJ. USA. Mar. 31, 2008, pp. 1362-1367, XP031243830, ISBN: 978-1-4244-1997-5.

(Continued)

*Primary Examiner* — David E England
(74) *Attorney, Agent, or Firm* — Jefferson IP Law, LLP

(57) ABSTRACT

A method and an apparatus for managing power of a Wireless Local Area Network (WLAN) module in a portable terminal are provided. In the method, the WLAN module is operated according to a Power Save Mechanism (PSM). Whether the portable terminal operates in a sleep state is determined. At least one of a beacon interval and a Delivery Traffic Indication Map (DTIM) interval of the PSM is changed depending on whether the portable terminal operates in the sleep state.

30 Claims, 5 Drawing Sheets

(58) Field of Classification Search
CPC ... H04W 52/0212; G06F 1/3203; Y02D 30/70
USPC ..... 370/311; 455/574
See application file for complete search history.

(56) References Cited

U.S. PATENT DOCUMENTS 7,433,669 B2 * 10/2008 Rue ..... H04L 12/12 455/343.2
7,593,417 B2 * 9/2009 Wang ..... H04W 72/005 370/428
7,668,128 B1 * 2/2010 Benveniste ..... H04W 28/18 370/252
7,672,263 B2 * 3/2010 Sinivaara ..... H04W 52/0229 370/318
7,693,117 B2 * 4/2010 Benveniste ..... H04L 12/12 370/338
7,792,066 B2 * 9/2010 Fujii ..... G06F 1/3209 370/311
7,877,117 B2 * 1/2011 Abhishek ..... H04W 52/0216 455/574
8,194,576 B2 * 6/2012 Kholaif ..... H04W 52/0216 370/310
8,208,973 B2 * 6/2012 Mehta ..... H04W 52/0216 455/574
8,355,716 B2 1/2013 Shimizu
8,379,556 B2 * 2/2013 Choi ..... H04W 52/0251 370/311
8,433,374 B2 * 4/2013 Deshpande ..... H04W 52/0216 455/574
9,232,471 B2 * 1/2016 Choi ..... H04L 61/2061
2004/0192284 A1 * 9/2004 Vaisanen et al. ..... 455/422.1
2004/0253996 A1 * 12/2004 Chen ..... H04W 52/0216 455/574
2004/0259542 A1 * 12/2004 Viitamaki et al. ..... 455/426.2
2005/0114444 A1 * 5/2005 Brown et al. ..... 709/203
2005/0221869 A1 * 10/2005 Liu et al. ..... 455/574
2006/0120314 A1 * 6/2006 Krantz et al. ..... 370/311
2006/0146769 A1 * 7/2006 Patel ..... H04W 52/0229 370/338
2006/0187864 A1 * 8/2006 Wang ..... H04W 48/12 370/311
2006/0270438 A1 * 11/2006 Choi ..... H04W 48/16 455/522
2007/0036096 A1 * 2/2007 Sinivaara ..... 370/318
2007/0297438 A1 12/2007 Meylan et al.
2008/0052545 A1 * 2/2008 Finkelstein et al. .. G06F 1/3228 713/300
2008/0219192 A1 * 9/2008 Sim et al. ..... 370/310
2008/0298290 A1 * 12/2008 Wentink ..... H04W 52/0216 370/311
2009/0003253 A1 1/2009 Wang et al.
2009/0086660 A1 * 4/2009 Sood ..... H04W 52/0293 370/311
2009/0103501 A1 * 4/2009 Farrag et al. ..... 370/337
2009/0149127 A1 * 6/2009 Viitamaki ..... H04M 1/725 455/41.2
2010/0080156 A1 * 4/2010 Nichols et al. ... H04W 52/0229 370/311
2010/0265864 A1 * 10/2010 He ..... H04W 68/025 370/311
2010/0278087 A1 * 11/2010 Kawakami et al. ..... 370/311
2011/0019555 A1 * 1/2011 Gotoh et al. ..... 370/252

FOREIGN PATENT DOCUMENTS

KR 10-2009-0033327 A 4/2009
WO 20061065692 A2 6/2006

OTHER PUBLICATIONS

Takefumi Hiraguri et al: "Study of Power 1-12 Saving Scheme Suitable for Wireless LAN in Multimedia Communication". Apr. 5, 2009, Wireless Communications and Networking Conference. 2009. WCNC 2009. IEEE. IEEE. Piscataway. NJ. USA, pp. 1-6, XP031454469, ISBN: 978-1-4244-2947-9.

European Search Report dated Apr. 23, 2019, issued in European Patent Application No. 18208693.4.

* cited by examiner

METHOD AND APPARATUS FOR MANAGING POWER OF WLAN MODULE IN PORTABLE TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

This application claims the benefit under 35 U.S.C. §119 (a) of a Korean patent application filed in the Korean Intellectual Property Office on Jun. 12, 2009 and assigned Serial No. 10-2009-0052540, the entire disclosure of which is hereby incorporated by reference.

BACKGROUND OF THE INVENTION

1. Field of the Invention

The present invention relates to a method and an apparatus for managing power of a Wireless Local Area Network (WLAN) module in a portable terminal. More particularly, the present invention relates to a method and an apparatus for managing power of a WLAN module by changing a beacon interval and a Delivery Traffic Indication Map (DTIM) interval depending on a state of a portable terminal.

2. Description of the Related Art

Recently, portable terminals having a Wireless Local Area Network (WLAN) function allowing a wireless network access have been introduced into the consumer market. The portable terminal accesses a wireless network through an Access Point (AP) that operates as a bridge and a router between the portable terminal and the network using a WLAN module. The above WLAN function provides better performance than other short distance wireless communication techniques with respect to communication speed. However, since data transmission between the WLAN and the AP may occur at anytime, the power of the WLAN module should always be turned on and maintained, thereby resulting in excessive power consumption.

Accordingly, a Power Save Mechanism (PSM) has been suggested in order to reduce power consumption caused by the WLAN module of the portable terminal. FIG. 1 is a view illustrating the PSM according to the related art. Referring to FIG. 1, a portable terminal that uses the PSM repeats an operation of maintaining an awake state 103 of the WLAN module and switches to a sleep state 105 on a beacon interval 101 basis. More particularly, when a packet to be transmitted/received exists, the portable terminal maintains the awake state 103 without switching to the sleep state 105 by exchanging a Traffic Indication Map (TIM)/ACKnowledge (ACK) packet during the awake state 103. For example, when a packet is to be transmitted from a terminal A 111 to a terminal B 113, the terminal A 111 transmits a TIM packet while in the awake state 103. After the terminal B 113 receives the TIM packet while in the awake state 103, the terminal B 113 transmits an ACK packet to the terminal A 111. Thereby, data communication has been performed by exchanging packets without switching to the sleep state 105. In contrast, a terminal C 115 having no packet to be transmitted/received switches from the awake state 103 to the sleep state 105.

FIG. 2 is a view illustrating a relationship between a beacon and a Delivery Traffic Indication Map (DTIM) according to the related art.

Referring to FIG. 2, a beacon interval 201 and a DTIM interval 203 are shown. Each terminal that uses the PSM maintains the awake state 103 during a relevant beacon interval by periodically selecting one beacon interval in order to receive a multicast or broadcast packet. Here, the selected beacon interval is referred to as a DTIM interval 203. That is, the terminal continues to maintain an awake state without switching to the sleep state during a DTIM interval that repeats at a fixed interval.

While a portable terminal enters a sleep mode because a user's input does not occur within a predefined time, that is, a host processor enters the sleep mode, a probability of receiving a multicast or broadcast packet is significantly reduced. However, the conventional portable terminal performs the PSM of the WLAN regardless of the state of the host processor, and accordingly, power is consumed unnecessarily. For example, the host processor of the portable terminal enters the sleep mode and the probability of receiving the multicast or broadcast packet is significantly reduced. However, since the WLAN maintains an awake state during a DTIM section periodically, power is wasted.

SUMMARY OF THE INVENTION

An aspect of the present invention is to address at least the above-mentioned problems and/or disadvantages and provide at least the advantages described below. Accordingly, an aspect of the present invention is to provide a method and an apparatus for managing power of a Wireless Local Area Network (WLAN) module in a portable terminal.

Another aspect of the present invention is to provide a method and an apparatus for managing power of a WLAN module provided inside a portable terminal depending on a state of the portable terminal.

Still another aspect of the present invention is to provide a method and an apparatus for reducing power consumption of a WLAN module by changing a beacon/Delivery Traffic Indication Map (DTIM) interval depending on an active/sleep state of a portable terminal.

In accordance with an aspect of the present invention, a method for managing power of a WLAN module in a portable terminal is provided. The method includes operating the WLAN module according to a Power Save Mechanism (PSM), determining whether the portable terminal operates in a sleep state, and changing at least one of a beacon interval and a DTIM interval of the PSM depending on whether the portable terminal operates in the sleep state.

In accordance with another aspect of the present invention, an apparatus for managing power of a WLAN module in a portable terminal is provided. The apparatus includes a host processor for detecting whether the portable terminal operates in a sleep state, and the WLAN module that operates according to a PSM, and that changes at least one of a beacon interval and a DTIM interval of the PSM depending on whether the portable terminal operates in the sleep state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the single forms "a," "an," and "the" include plural referents unless the context clearly dictates otherwise. Thus, for example, reference to "a component surface" includes reference to one or more of such surfaces.

Exemplary embodiments of the present invention provide a technique for managing power of a Wireless Local Area Network (WLAN) module included with a portable terminal depending on an active/sleep state of the portable terminal. In the following description, the active/sleep state (mode) of the portable terminal denotes an active/sleep state of a host processor for controlling and processing overall operations of the portable terminal. In addition, a power save mode denotes a mode of repeatedly switching between an awake state and a sleep state according to the Power Save Mechanism (PSM) of the related art. Here, the awake state (or awake mode) denotes a state where the WLAN module operates with power of a predefined level or more to transmit/receive a packet. The sleep state denotes a state where the WLAN module operates with power of less than the predefined level and packet transmission/reception is not performed. In addition, a beacon interval denotes an interval where a section for Traffic Indication Map (TIM) transmission/reception repeats itself. The WLAN module may be switched from an awake state to a sleep state, or may maintain the awake state during the beacon interval. The Delivery Traffic Indication Map (DTIM) interval denotes an interval having a repeating DTIM section. The DTIM section denotes a section where an awake state is maintained for receiving a multicast or broadcast packet.

Figure 1:
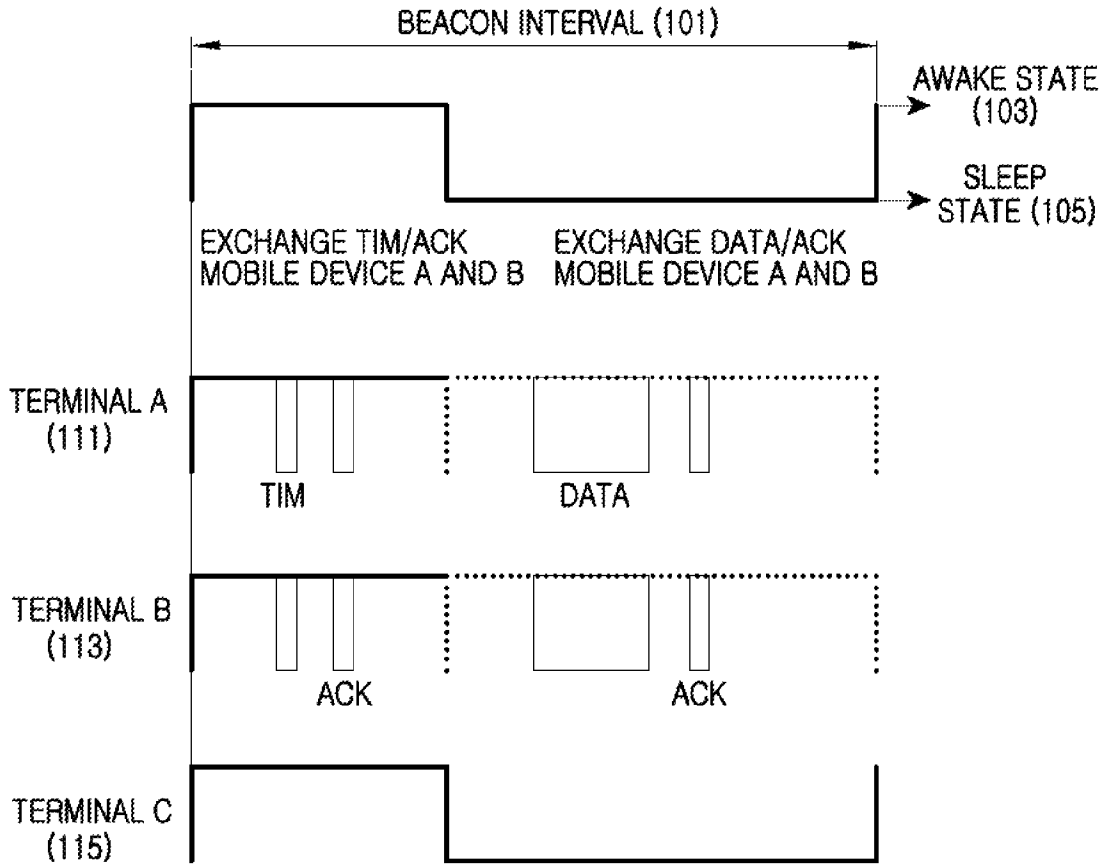
FIG. 1 (RELATED ART)
FIG. 1 is a view illustrating a Power Save Mechanism (PSM) according to the related art.
Figure 2:
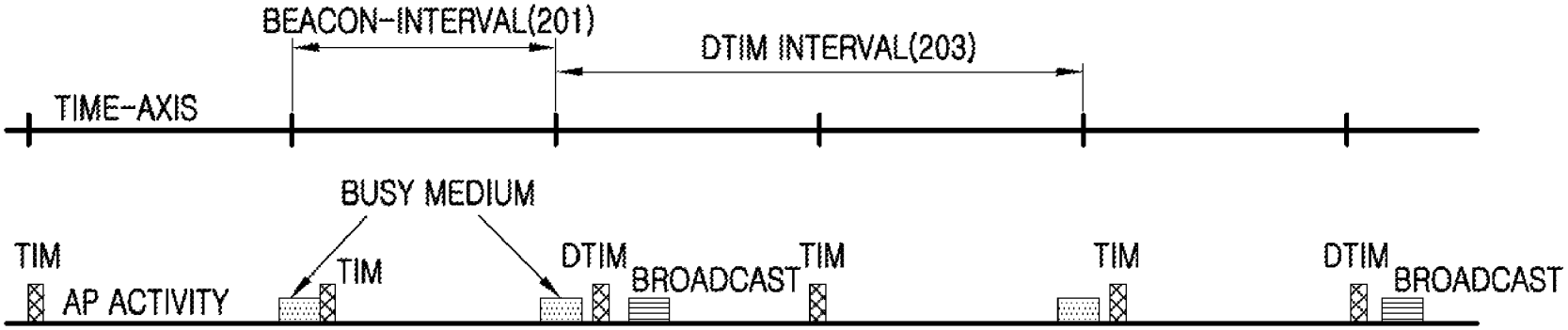
FIG.2 (RELATED ART)
FIG. 2 is a view illustrating a relationship between a beacon and a Delivery Traffic Indication Map (DTIM) according to the related art.
Figure 3:
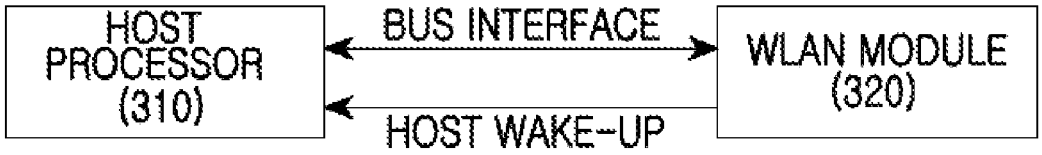
FIG. 3 is a block diagram illustrating a portable terminal according to an exemplary embodiment of the present invention.

FIG. 3 is a block diagram illustrating a portable terminal according to an exemplary embodiment of the present invention.

Referring to FIG. 3, the portable terminal includes a host processor 310 and a WLAN module 320.

The host processor 310 controls and processes overall operations of the portable terminal When an application that uses WLAN is performed, the host processor 310 supplies power to the wireless LAN module 320. In addition, the host processor 310 requests the WLAN module 320 switch to a power save mode that operates according to the PSM. When there is no user's input or a packet is not received within a predefined time, the host processor 310 controls and processes a function for switching the portable terminal to a sleep state, and induces a beacon/DTIM interval of the WLAN module 320 to be changed by informing the WLAN module 320 of entry to a sleep state. In addition, the host processor 310 in the sleep state awakens from the sleep state when a user's input occurs or by receiving a wakeup signal from the WLAN module 320, and performs a control for switching to the active state and processing a relevant operation.

The WLAN module 320 receives power from the host processor 310, and switches to a power save mode according to a request of the host processor 310 to repeatedly perform switching between an awake state and a sleep state on a beacon interval basis. At this point, the WLAN module 320 switches between the awake state and the sleep state according to a predefined beacon interval and DTIM interval during the power save mode. More particularly, when a signal informing of entry into a sleep state is received from the host processor 310, the WLAN module 320 changes the beacon interval and the DTIM interval during the power save mode. That is, when the portable terminal enters a sleep state, the WLAN module 320 changes the beacon interval and the DTIM interval to a long beacon interval and a long DTIM interval to minimize a time that the WLAN module 320 operates in an awake state, thereby reducing power consumption. After that, when a packet is received from an Access Point (AP) or a signal informing of a sleep state end is received from the host processor 310, the WLAN module 320 restores the beacon interval and DTIM interval to the original beacon interval and DTIM interval. Here, when a packet is received from the AP, the WLAN module 320 transmits a wakeup signal to the host processor 310 in the sleep state.

Figure 4:
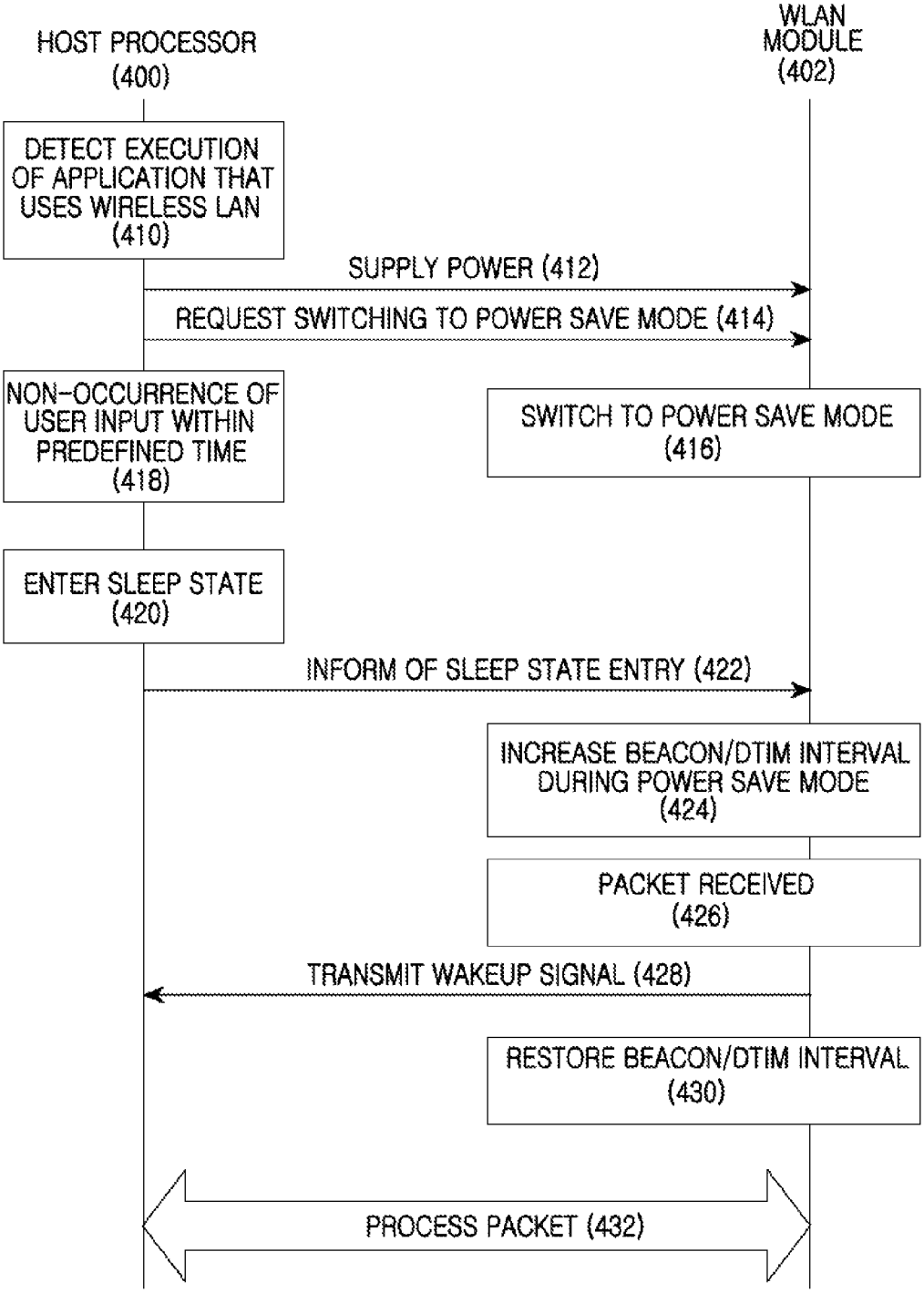
FIG. 4 is a flowchart illustrating a signal flow between a host processor and a Wireless Local Area Network (WLAN) module in a portable terminal according to an exemplary embodiment of the present invention.

FIG. 4 is a flowchart illustrating a signal flow between a host processor and a WLAN module in a portable terminal according to an exemplary embodiment of the present invention.

Referring to FIG. 4, the host processor 400 detects execution of an application that uses a WLAN in step 410. The host processor 400 supplies power to the WLAN module 402 in step 412, and requests the WLAN module 402 to switch to a power save mode in step 414. The WLAN module 402 that has received the request switches to the power save mode to repeatedly perform switching between an awake state and a sleep state on a beacon interval basis in step 416. At this point, the WLAN module 402 switches between the awake state and the sleep state based on the predefined beacon interval and DTIM interval. For example, the WLAN module 402 sets the beacon interval and DTIM interval to 100 ms and 300 ms, respectively, which are predefined values, to switch between the awake state and the sleep state.

The host processor 400 detects that a user's input does not occur within a predefined time in step 418, enters a sleep state in step 420, and informs the WLAN module 402 of sleep state entry in step 422. The WLAN module 402 increases the beacon interval and DTIM interval during the power save mode in step 424. For example, the WLAN module 402 switches between the awake state and the sleep state by changing the beacon interval and the DTIM interval, which have been set to 100 ms and 300 ms, respectively, to 200 ms and 1000 ms, respectively. It is possible to minimize a time for which the WLAN module 402 operates in the awake state by increasing the beacon interval and the DTIM interval while the host processor 400 is in the sleep state.

When it is detected that a packet is received in step 426, the WLAN module 402 transmits a wakeup signal to the host processor 400 in step 428, and restores the beacon interval and the DTIM interval in step 430. For example, the WLAN module 402 restores the beacon interval and DTIM interval, which have been set to 200 ms and 1000 ms, respectively, to 100 ms and 300 ms, respectively, which are the predefined values, and switches between the awake state and the sleep state. Here, step 428 and step 430 may be simultaneously performed, and the order of the performance may change. The host processor 400 that has received the wakeup signal ends the sleep state and switches to the active state.

The host processor 400 and the WLAN module 402 process a relevant packet in step 432.

Figure 5:
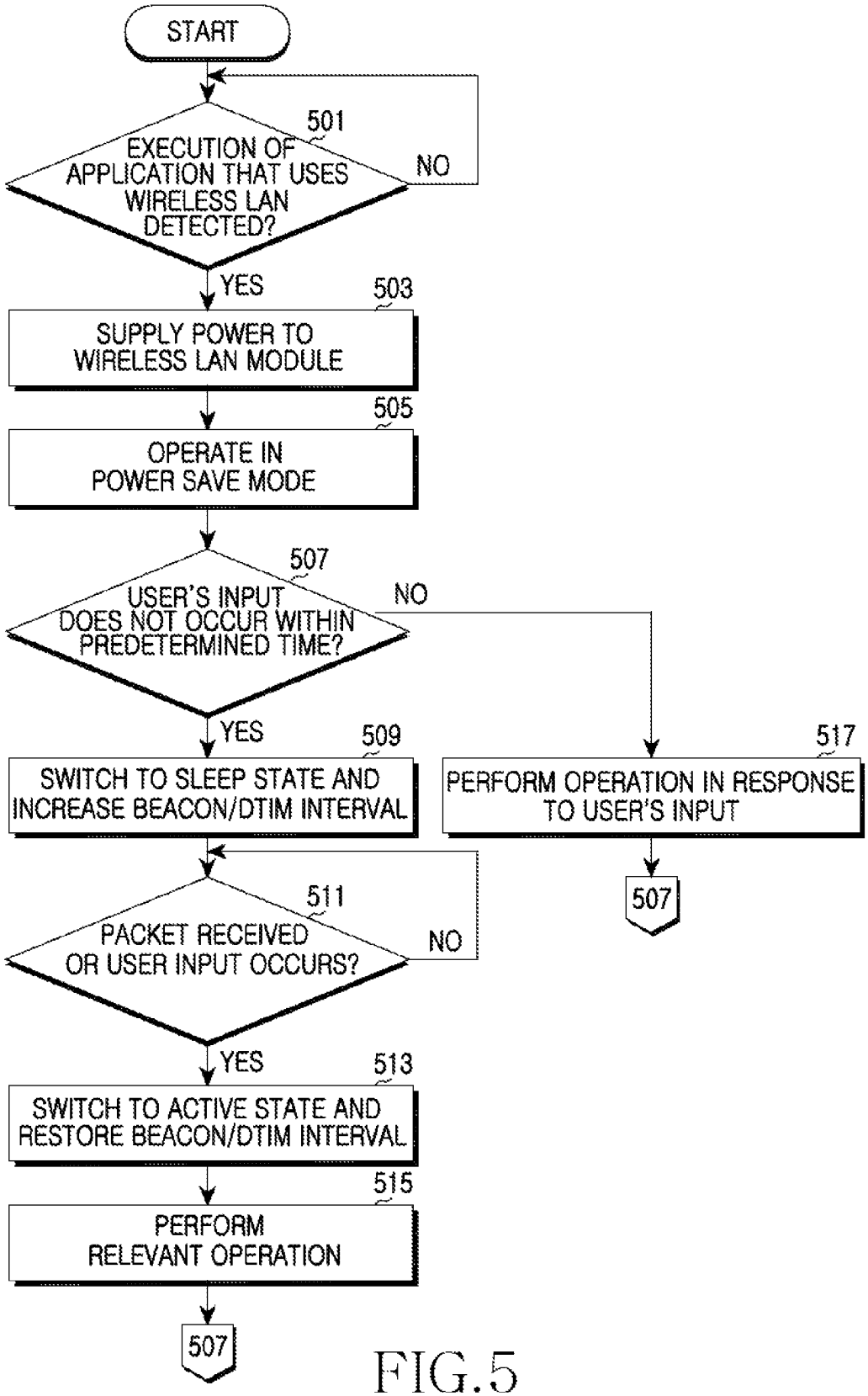
FIG. 5 is a flowchart illustrating an operation procedure of a portable terminal according to an exemplary embodiment of the present invention.

FIG. 5 is a flowchart illustrating an operation procedure of a portable terminal according to an exemplary embodiment of the present invention.

Referring to FIG. 5, when execution of an application that uses a WLAN is detected in step 501, the portable terminal supplies power to the WLAN module in step 503, and allows the WLAN module to operate in a power save mode in step 505. Here, the portable terminal allows the WLAN module to repeatedly switch and operate between the awake state and the sleep state based on the predefined beacon interval and DTIM interval.

The portable terminal detects whether a user's input does not occur within a predefined time in step 507. When a user's input occurs within the predefined time, the portable terminal performs an operation in response to the user's input in step 517, and returns to step 507.

In contrast, when the user's input does not occur within the predefined time, the portable terminal switches to the sleep state, informs the WLAN module of the sleep state, and increases the beacon interval and the DTIM interval in step 509. For example, when the WLAN module performs the power save mode at the beacon interval and the DTIM interval that have been set to 100 ms and 300 ms, respectively, the portable terminal changes the beacon interval and the DTIM interval to 200 ms and 1000 ms, respectively.

After that, the portable terminal determines whether a packet is received from an AP or a user's input occurs in step 511. When the packet is received or the user's input occurs, the portable terminal switches from the sleep state to the active state, and restores the increased beacon interval and DTIM interval in step 513. After that, the portable terminal performs a relevant operation in step 515. That is, the portable terminal processes a received packet or performs an operation in response to the user's input, and returns to step 507 to perform subsequent steps.

Though, when the host processor of the portable terminal enters the sleep state, the portable terminal changes the beacon interval and the DTIM interval in order to reduce power consumption of the WLAN module in the above description, the portable terminal may change only one of the beacon interval and the DTIM interval.

An exemplary embodiment of the present invention may reduce power consumption by a WLAN module provided to a portable terminal, as the portable terminal changes the beacon/DTIM interval depending on active/sleep state of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing power of a Wireless Local Area Network (WLAN) module in a portable terminal, the method comprising:

operating the WLAN module according to a Power Save Mechanism (PSM);

determining, *by the WLAN module,* whether *a host processor of* the portable terminal [operates in] *enters* a sleep [state] *mode while the WLAN module is operated according to the PSM*; and

[changing] *in response to determining that the host processor of the portable terminal enters the sleep mode, changing, by the WLAN module,* a duration of [at least one of a beacon interval and] a Delivery Traffic Indication Map (DTIM) interval of the PSM [depending on whether the portable terminal operates in the sleep state] *of the WLAN module from a first duration to a second duration.*

2. The method of claim 1, wherein the changing of the duration of [the at least one of the beacon interval and] the DTIM interval *of the WLAN module* comprises:

[while] *in response to* the *host processor of the* portable terminal [operates in] *informing the WLAN module of entry into* the sleep [state] *mode*, increasing the duration of [the at least one of the beacon interval and] the DTIM interval *to the second duration*; and

[when] *in response to* the sleep [state] *mode* of the *host processor of the* portable terminal [ends] *ending*, [restoring] *decreasing* the duration of [the at least one of the beacon interval and] the DTIM interval [that was increased] *to the first duration,*

*wherein the WLAN module operates in an awake state during a section of the DTIM interval and in a sleep state during another section of the DTIM interval, and*

*wherein the section is repeated based on the DTIM interval.*

3. The method of claim 1, wherein the determining of whether the *host processor of the* portable terminal [operates in] *enters* the sleep [state] *mode* comprises:

*determining whether a predefined time elapses without a user's input while the WLAN module operates according to the PSM; and* when [a] *the predefined time elapses without the* user's input [does not occur within a predefined time] *occurring*, determining that the *host processor of the* portable terminal [operates in] *has entered* the sleep [state] *mode.*

4. The method of claim 3, [wherein] *further comprising*, when [it has been determined that] the *host processor of the* portable terminal [operates] *is* in the sleep [state] *mode and at least one of the user's input occurs or a packet is received*, [determining that] *signaling* the [portable] *host processor of the* terminal [no longer operates in] *to wake up from* the sleep [state when the user's input occurs or a packet is received] *mode*.

5. The method of claim 1, wherein the determining of whether the *host processor of the* portable terminal [operates in] *enters* the sleep [state] *mode* comprises:

when a user's input occurs [within] *before* a predefined time *elapses while the WLAN module operates according to the PSM*, determining that the *host processor of the* portable terminal does not [operate in] *enter* the sleep [state] *mode*.

6. The method of claim 1, wherein the PSM comprises a technique in which the WLAN module repeatedly switches between an awake state [where] *in which* the WLAN module operates with power of a predefined level or more to [transmit/receive] *perform transmission or reception of* a packet, and a sleep state [where] *in which* the WLAN module operates with power of less than the predefined level and [so] *does not perform* packet [transmission/reception is not performed] *transmission or reception*.

7. [An apparatus] *A portable terminal* for managing power of a Wireless Local Area Network (WLAN) module in [a] *the* portable terminal, the [apparatus] *portable terminal* comprising:

a host processor [for detecting whether] *of* the portable terminal [operates in a sleep state]; and the WLAN module [that operates] *which is powered by the host processor and configured to:*

*operate* according to a Power Save Mechanism (PSM),

*detect whether the host processor of the portable terminal enters a sleep mode while the WLAN module is operated according to the PSM,* and

[that changes] *in response to detecting that the host processor of the portable terminal has entered the sleep mode, change* a duration of [at least one of a beacon interval and] a Delivery Traffic Indication Map (DTIM) interval of the PSM [depending on whether the portable terminal operates in the sleep state] *of the WLAN module from a first duration to a second duration.*

8. The [apparatus] *portable terminal* of claim 7, wherein the WLAN module [increases] *is further configured to increase* the duration of [the at least one of the beacon interval and] the DTIM interval [while] *to the second duration in response to* the *host processor of the* portable terminal [operates in] *informing the WLAN module of entry into* the sleep [state] *mode*, and [restores] *to decrease* the duration of [the at least one of the beacon interval and] the DTIM interval [that was increased when the sleep state of the portable terminal ends] *to the first duration in response to the sleep mode of the host processor of the portable terminal ending,*

*wherein the WLAN module operates in an awake state during a section of the DTIM interval and in a sleep state during another section of the DTIM interval, and*

*wherein the section is repeated based on the DTIM interval.*

9. The [apparatus] *portable terminal* of claim [8] *7*, wherein [after] the host processor *of the portable terminal is further configured to:*

*determine whether a predefined time elapses without a user's input occurring while the WLAN module operates according to the PSM, and*

[has determined] *determine* that the *host processor of the* portable terminal [operates in] *enters* the sleep [state, the host processor determines the portable terminal no longer operates in the sleep state when a signal informing that the user's input occurs or a packet is received from the outside is received] *mode when the predefined time elapses without the user's input occurring.*

10. The [apparatus] *portable terminal* of claim [7] *8*, wherein after the host processor [determines] *of* the portable terminal [operates in] *enters* the sleep [state when a user's input does not occur within a predefined time] *mode, the host processor of the portable terminal is further configured to wakeup from the sleep mode in response to a signal informing that a user's input occurs or a packet is received.*

11. The [apparatus] *portable terminal* of claim 7, wherein the host processor [determines the portable terminal does] *of the portable terminal is further configured to determine to* not [operate in] *enter* the sleep [state] *mode* when a user's input occurs [within] *before* a predefined time *elapses*.

12. The [apparatus] *portable terminal* of claim 7, wherein the PSM comprises a technique in which the WLAN module repeatedly switches between an awake state [where] *in which* the WLAN module operates with power of a predefined level or more to [transmit/receive] *perform transmission or reception of* a packet, and a sleep state [where] *in which* the WLAN module operates with power of less than the predefined level and [so] *does not perform* packet [transmission/reception is not performed] *transmission or reception*.

*13. A method for operating a portable terminal, the method comprising:*

*operating a wireless local area network (WLAN) module according to a power save mechanism (PSM);*

*determining, while the WLAN module operates according to the PSM, whether a predefined time elapses without a user's input occurring; and*

*in response to the predefined time elapsing without the user's input occurring, controlling the WLAN module to change a delivery traffic indication map (DTIM) interval of the PSM of the WLAN module from a first interval to a second interval.*

*14. The method of claim 13, further comprising:*

*in response to the predefined time elapsing without the user's input occurring, controlling a host processor of the portable terminal to enter a sleep mode from an active mode; and*

*informing the WLAN module of entry into the sleep mode of the host processor of the portable terminal,*

*wherein the WLAN module operates in an awake state during a section of the DTIM interval and in a sleep state during another section of the DTIM interval, and*

*wherein the section is repeated based on the DTIM interval.*

*15. The method of claim 13, wherein the second interval is larger than the first interval.*

*16. The method of claim 13, further comprising, after controlling the WLAN module to change the DTIM interval of the PSM to the second interval, determining whether the predefined time elapses without the user's input occurring.*

*17. The method of claim 16, further comprising, in response to the user's input occurring before the predefined time elapses, controlling the WLAN module based on the DTIM interval set to the first interval.*

*18. The method of claim 14, further comprising, after controlling the WLAN module to change the DTIM interval of the PSM, in response to receiving a packet, configuring the WLAN module to restore the DTIM interval of the PSM to the first interval.*

*19. The method of claim 18, further comprising, in response to receiving the packet, waking up the host processor of the portable terminal into the active mode from the sleep mode.*

*20. The method of claim 13, further comprising:*

*in response to the predefined time elapsing without the user's input occurring, controlling the WLAN module to change a beacon interval of the PSM from a third interval to a fourth interval.*

*21. The method of claim 13, wherein the PSM comprises an awake state during which the WLAN module operates with power of a predetermined level, and a sleep state during which the WLAN module operates with power of less than the predetermined level.*

*22. A portable terminal, comprising:*

*a wireless local area network (WLAN) module; and*

*a host processor of the portable terminal configured to:*

*control the WLAN module according to a power save mechanism (PSM),*

*determine, while the WLAN module operates according to the PSM, whether a predefined time elapses without a user's input occurring, and*

*in response to the predefined time elapsing without the user's input occurring, control the WLAN module to change a delivery traffic indication map (DTIM) interval of the PSM of the WLAN module from a first interval to a second interval.*

*23. The portable terminal of claim 22,*

*wherein, in response to the predefined time elapsing without the user's input occurring, the host processor of the portable terminal is further configured to enter a sleep mode from an active mode, and inform the WLAN module of entry into the sleep mode of the host processor of the portable terminal,*

*wherein the WLAN module operates in an awake state during a section of the DTIM interval and in a sleep state during another section of the DTIM interval, and*

*wherein the section is repeated based on the DTIM interval.*

*24. The portable terminal of claim 22, wherein the second interval is larger than the first interval.*

*25. The portable terminal of claim 22, wherein the host processor of the portable terminal is further configured to determine whether the user's input occurs before the predefined time elapses, after controlling the WLAN module to set the DTIM interval of the PSM as the first interval.*

*26. The portable terminal of claim 25, wherein the host processor of the portable terminal is further configured to control the WLAN module based on the DTIM interval set to the first interval, in response to the user's input occurring before the predefined time elapses.*

*27. The portable terminal of claim 23, wherein, after controlling the WLAN module to change the DTIM interval of the PSM, the WLAN module is further configured to restore the DTIM interval of the PSM to the first interval in response to receiving a packet.*

*28. The portable terminal of claim 27, wherein the host processor of the portable terminal is further configured to enter the active mode from the sleep mode in response to receiving the packet.*

*29. The portable terminal of claim 22,*

*wherein the host processor of the portable terminal is further configured to control the WLAN module to change a beacon interval of the PSM from a third interval to a fourth interval in response to the predefined time elapsing without the user's input occurring.*

*30. The portable terminal of claim 22, wherein the PSM comprises an awake state where the WLAN module operates with power of a predetermined level, and a sleep state where the WLAN module operates with power of less than the predetermined level.*

* * * * *